US 9,640,285 B2

(12) United States Patent
Shin et al.

(10) Patent No.: US 9,640,285 B2
(45) Date of Patent: May 2, 2017

(54) PROBE AND APPARATUS FOR MEASURING THICKNESS OF OXIDE LAYER OF FUEL ROD

(75) Inventors: Jung Cheol Shin, Daejeon (KR); Sang Kyun Woo, Daejeon (KR); Yong Chan Kim, Daejeon (KR); Sung Min Kim, Daejeon (KR); Chae Joon Lim, Daejeon (KR)

(73) Assignee: KEPCO NUCLEAR CO., LTD., Daejeon (KR)

( * ) Notice: Subject to any disclaimer, the term of this patent is extended or adjusted under 35 U.S.C. 154(b) by 1302 days.

(21) Appl. No.: 13/335,197

(22) Filed: Dec. 22, 2011

(65) Prior Publication Data

US 2013/0010911 A1 Jan. 10, 2013

(30) Foreign Application Priority Data

Jul. 8, 2011 (KR) .................. 10-2011-0067727

(51) Int. Cl.
*G21C 17/06* (2006.01)

(52) U.S. Cl.
CPC .................. *G21C 17/06* (2013.01)

(58) Field of Classification Search
CPC . G01B 7/105; G01B 7/10; G01B 7/14; G01B 7/12; G01B 15/0002; G01B 15/08; G01B 17/025; G21C 17/06; G21C 17/08; G21C 3/07; G21C 17/003; G21C 17/01; G21C 17/013; G21C 17/017; G21C 17/07; G21Y 2002/204; G21Y 2002/205; G21Y 2004/403; G21Y 2004/30; G21Y 2004/40;

(Continued)

(56) References Cited

U.S. PATENT DOCUMENTS 3,394,304 A * 7/1968 Green .................. G01N 27/023
324/234
4,195,411 A * 4/1980 Gerkey ......................... 33/783
(Continued)

FOREIGN PATENT DOCUMENTS

| KR | 10-0735213 B1 | 4/2001 |
| KR | 20-0339313 Y1 | 1/2004 |
| KR | 10-2004-0012065 A | 2/2004 |

OTHER PUBLICATIONS

English Language Abstract of KR 10-2004-0012065 A.
English Language Abstract of KR 10-2001-0030415 a which is an application publication of KR 10-0735213 B1.

*Primary Examiner* — Jack W Keith
*Assistant Examiner* — Sharon M Davis
(74) *Attorney, Agent, or Firm* — Rabin & Berdo, P.C.

(57) ABSTRACT

Provided are a probe and an apparatus for measuring a thickness of an oxide layer of a fuel rod, capable of testing claddings of inner and outer fuel rods of a nuclear fuel assembly without disassembling the nuclear fuel assembly. The probe includes a fuel rod transfer region on which an eddy current sensor capable of continuously testing claddings of outer fuel rods of a fixed nuclear fuel assembly is mounted. Further, the apparatus includes a frame in which a cylinder driven in upward and downward directions is mounted, a first probe connected to one side of the cylinder in order to test claddings of outer fuel rods of a nuclear fuel assembly, and a second probe connected to the other side of the cylinder in order to test claddings of inner fuel rods of the nuclear fuel assembly.

5 Claims, 5 Drawing Sheets

(58) Field of Classification Search
CPC ....... G21Y 2002/103; G21Y 2002/104; G21Y 2002/207; G21Y 2004/201; G01N 27/9013; G01N 29/043; G01N 27/90; G01N 27/902; G01N 27/904; H01F 1/342; H01J 37/32926; H01J 37/32935; A61L 2300/608
See application file for complete search history.

(56) References Cited

U.S. PATENT DOCUMENTS

| | | | | |
|---|---|---|---|---|
| 4,355,281 | A * | 10/1982 | Toth | G01N 27/9046 324/232 |
| 4,728,483 | A * | 3/1988 | Ahmed et al. | 376/258 |
| H1262 | H * | 12/1993 | Bacvinskas | G21C 17/06 376/251 |
| 5,341,678 | A * | 8/1994 | Kervinen | 73/150 R |
| 5,754,611 | A * | 5/1998 | Petit | G01B 7/14 376/258 |
| 6,344,739 | B1 * | 2/2002 | Hardy et al. | 324/220 |
| 6,895,066 | B1 * | 5/2005 | Busch | G01B 7/105 376/245 |
| 7,388,369 | B2 * | 6/2008 | Edsinger et al. | 324/230 |
| 8,832,952 | B2 * | 9/2014 | Shin et al. | 33/502 |
| 2002/0149360 | A1 * | 10/2002 | Le | 324/230 |
| 2004/0051523 | A1 | 3/2004 | Pigelet et al. | |
| 2005/0056105 | A1 * | 3/2005 | Delacroix | G01N 29/043 73/865.8 |
| 2005/0104585 | A1 * | 5/2005 | Bilik et al. | 324/240 |
| 2007/0144993 | A1 * | 6/2007 | Knoop | H05K 7/1495 211/189 |

* cited by examiner

PROBE AND APPARATUS FOR MEASURING THICKNESS OF OXIDE LAYER OF FUEL ROD

CROSS-REFERENCE TO RELATED APPLICATIONS

The present application claims priority under 35 U.S.C. 119 to Korean Patent Application No. 10-2011-0067727, filed on Jul. 8, 2011, the disclosure of which is expressly incorporated by reference herein in its entirety.

BACKGROUND OF THE INVENTION

1. Field of the Invention

The present invention relates, in general, to an apparatus for measuring the thickness of an oxide layer formed on a cladding of each fuel rod of a nuclear fuel assembly using an eddy current sensor and, more particularly, to an apparatus for measuring the thickness of an oxide layer of a fuel rod, which includes driving means for providing movement in upward and downward, forward and backward, and leftward and rightward directions, a first probe for testing claddings of fuel rods placed in an outer side of a nuclear fuel assembly (hereinafter, "outer fuel rods"), and a second probe for testing claddings of fuel rods placed in an inner side of the nuclear fuel assembly (hereinafter, "inner fuel rods").

2. Description of the Related Art

During operation of a nuclear reactor, fuel rods disposed on each nuclear fuel assembly are immersed in a coolant/moderator in a reactor core. In light water reactors using zirconium or zircaloy cladding tubes for fuel rods, zirconium oxide (zirconia) is deposited on the fuel rods at a thickness of about 100 μm by a reaction between a coolant/moderator using water and zirconium in the cladding tubes. An adverse effect caused by the zirconia produced when heat is being transferred from the fuel rod cladding tube to the coolant/moderator and a metal loss which damages the structural integrity of the cladding tube, cause the thickness of the cladding tube to be reduced. As such, a restriction is placed on the maximum amount of oxide allowable to each fuel rod. Once the amount of oxide reaches this limit, the fuel rod must be replaced.

Thus, the thickness measurement of the oxide layer is important for accurately evaluating the thermohydraulic performance of the fuel rod, estimating operational restrictions of the fuel rod, and estimating the longevity of the fuel rod.

Generally, the thickness of the oxide layer of the fuel rod is measured by eddy current testing, and the damage to the fuel rod is checked by ultrasonic testing.

Examples of the related art for measuring the thickness of the oxide layer of the fuel rod using eddy current testing include Korean Registered Utility Model No. 20-0339313, entitled "The probe fixture for eddy current testing of the RCCA of nuclear fuel type," Korean Patent Application Publication No. 10-2004-0012065, entitled "Transfer apparatus of nuclear fuel rod for eddy current testing," Korean Patent No. 10-0735213, entitled "Method for measuring oxide thickness underlying a ferromagnetic material on nuclear fuel rods," and so forth.

However, the eddy current testing disclosed in the related art requires much time to do a test because the nuclear fuel assembly should be disassembled and fuel rods disassembled from the nuclear fuel assembly should be tested one by one. As such, it cannot efficiently test the oxide layers of the fuel rods.

BRIEF SUMMARY OF THE INVENTION

Accordingly, the present invention has been made keeping in mind the problems of the related art, and an objective of the present invention is to provide a probe capable of continuously testing claddings of outer fuel rods of a nuclear fuel assembly without disassembling the nuclear fuel assembly while moving along a length of each fuel rod in upward and downward directions.

Another objective of the present invention is to provide an apparatus for measuring the thickness of an oxide layer of a fuel rod, which includes first and second probes capable of testing claddings of outer and inner fuel rods of a nuclear fuel assembly without disassembling the nuclear fuel assembly.

In order to achieve the above objectives, according to one aspect of the present invention, there is provided a probe, which comprises an eddy current sensor and a fuel rod transfer region so as to be able to continuously test a cladding of an outer fuel rod of a nuclear fuel assembly while moving in upward and downward directions.

The probe can include a plurality of transfer regions having a semicircular lengthwise channel, and particularly, a fuel rod transfer region on which an eddy current sensor is mounted, a transfer roller disposed above the fuel rod transfer region, and transfer support regions disposed on either sides of the fuel rod transfer region. The probe can continuously test the cladding of the outer fuel rod of the nuclear fuel assembly while moving in upward and downward directions.

According to another aspect of the present invention, there is provided an apparatus for measuring a thickness of an oxide layer of a fuel rod. The apparatus comprises a frame in which a cylinder driven in upward and downward directions is mounted, a first probe that is connected to one side of the cylinder in order to test claddings of outer fuel rods of a nuclear fuel assembly, and a second probe that is connected to another side of the cylinder in order to test claddings of inner fuel rods of the nuclear fuel assembly.

The first probe can continuously test the claddings of outer fuel rods of the fixed nuclear fuel assembly using a first eddy current sensor 131 while moving in upward and downward directions.

The second probe can include a strip and a second eddy current sensor, and test the claddings of inner fuel rods of the fixed nuclear fuel assembly using the second eddy current sensor while moving in forward and backward directions.

According to the present invention as described above, the probe can continuously test the cladding of each outer fuel rod of the fixed nuclear fuel assembly while moving in upward and downward directions, so that it can examine the state of the oxide layer of the outer fuel rod all over rather than at a specific point.

Further, the apparatus for measuring the thickness of an oxide layer of a fuel rod can simultaneously test the claddings of the outer and inner fuel rods of the nuclear fuel assembly without disassembling the nuclear fuel assembly, so that it can rapidly and efficiently measure the thickness of the oxide layer of each fuel rod.

BRIEF DESCRIPTION OF THE DRAWINGS

The above and other objectives, features and further advantages of the present invention will be more clearly understood from the following detailed description when taken in conjunction with the accompanying drawings, in which.

DETAILED DESCRIPTION OF THE INVENTION

Figure 1A:
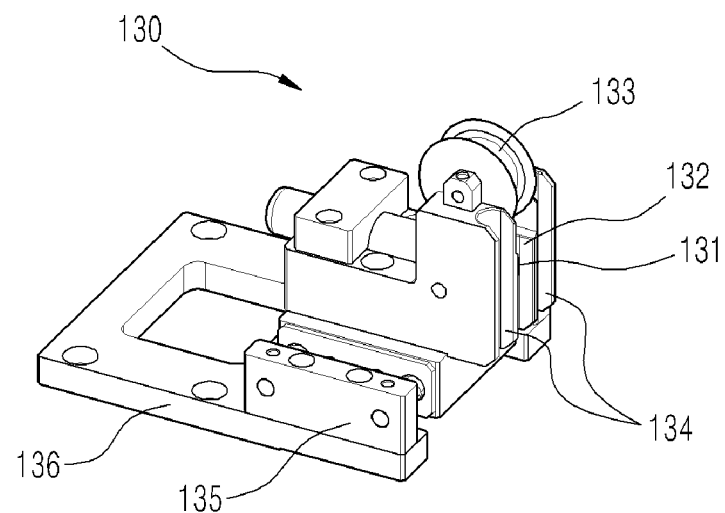
FIG. 1A is a perspective view showing a probe used in the present invention.

Reference will now be made in greater detail to an exemplary embodiment of the invention with reference to the accompanying drawings. Wherever possible, the same reference numerals will be used throughout the drawings and the description to refer to the same or like parts. In the following description, it is to be noted that, when the functions of conventional elements or the detailed description of elements related to the present invention may make the gist of the present invention unclear, a detailed description of those elements will be omitted.

Nuclear fuel is arranged in a nuclear reactor on the basis of a nuclear fuel assembly. One nuclear fuel assembly is made up of tens or hundreds of fuel rods. One fuel rod is designed so that uranium pellets are covered with a zircaloy cladding tube having a thickness of 1 mm so as to be protected from external damage and to prevent radioactivity from leaking. The fuel rod has a diameter of about 9.5 mm, and an interval between the fuel rods is about 3.3 mm.

As shown in FIGS. 1 to 6, a first probe 130 of the present invention includes a first eddy current sensor 131, a fuel rod transfer region 132, a transfer roller 133, transfer support regions 134, lateral support frames 135, and a first lower plate 136.

Further, an apparatus for measuring the thickness of an oxide layer of a fuel rod is generally made up of a measurement unit 100, a transverse transfer unit 200 allowing the measurement unit 100 to move in leftward and rightward directions, a longitudinal transfer unit 300 allowing the measurement unit 100 to move in forward and backward directions, and a support unit 400 supporting the transverse transfer unit 200 and the longitudinal transfer unit 300.

Figure 1B:
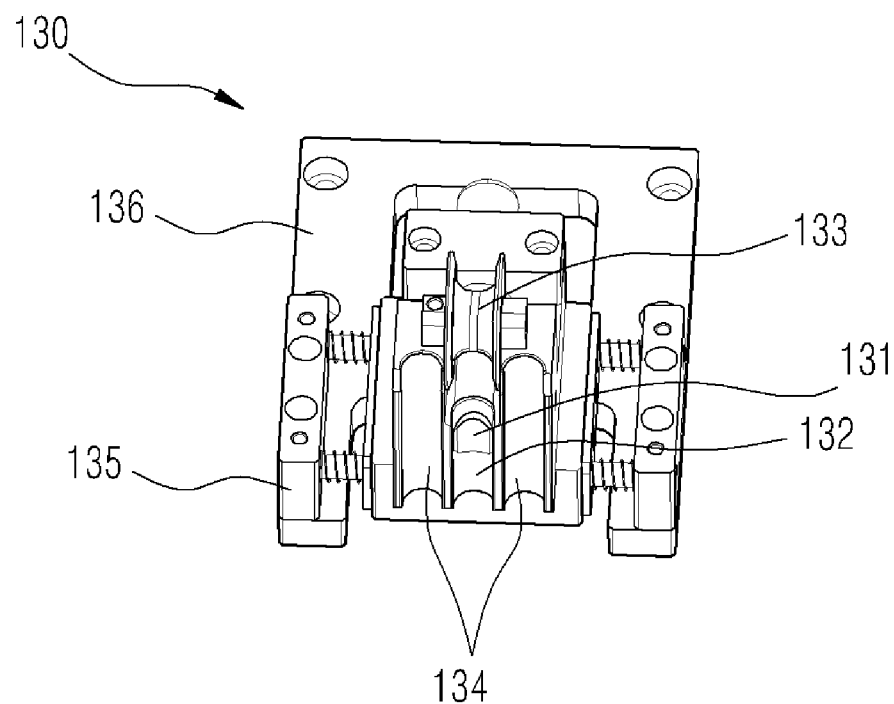
FIG. 1B is another perspective view showing the probe used in the present invention.
Figure 2:
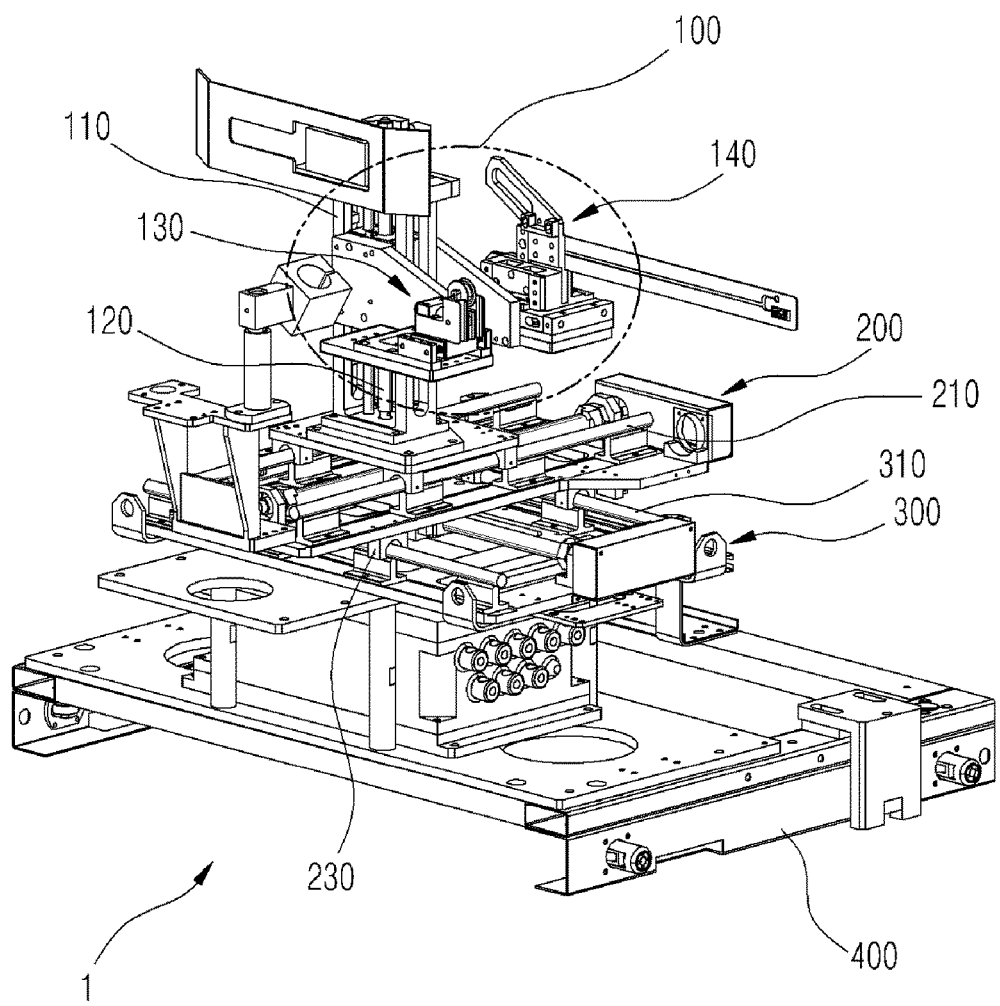
FIG. 2 is a perspective view showing an apparatus for measuring a thickness of an oxide layer of a fuel rod according to an exemplary embodiment of the present invention.

As shown in FIGS. 1A and 1B, the first probe 130 is a part that is configured to measure the thickness of an oxide layer of a fuel rod to be tested. The first eddy current sensor 131 is mounted on the first probe 130 so as to come into contact with a cladding of the fuel rod. The first eddy current sensor 131 detects an amount of eddy current induced on the fuel rod. Thereby, the thickness of the oxide layer of the fuel rod can be measured. In this embodiment, the eddy current sensor is a contact type of sensor, but it can be a contactless sensor or a proximity sensor.

In detail, the fuel rod transfer region 132, in which a semi-circular channel is formed in a lengthwise direction at a predetermined length, is located between the transfer support regions 134, and the transfer roller 133 is mounted above the fuel rod transfer region 132 in a lengthwise direction.

The transfer support regions 134, in each of which a semi-circular channel is formed in a lengthwise direction and is longer than that of the fuel rod transfer region 132, are located on either sides of the fuel rod transfer region 132, respectively. Further, the part configured to measure the thickness of the oxide layer of the fuel rod is fixed to the lateral support frames 135 connected to a lateral portion thereof, and the lateral support frames 135 are fixed by a first lower plate 136 connected to a bottom surface thereof.

Figure 3:
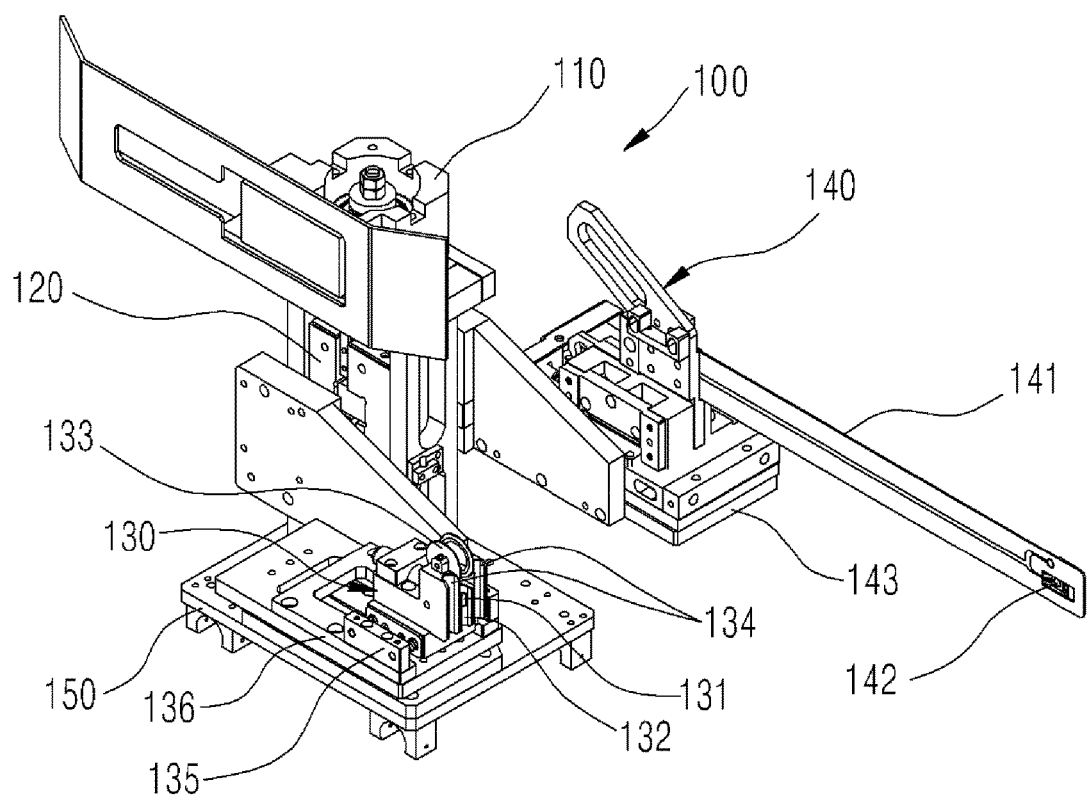
FIG. 3 is a perspective view showing a measurement unit used in the present invention.

That is, the first lower plate 136 of the first probe 130 is connected to one side of a cylinder 120, as shown in FIG. 3. The fuel rod to be tested comes into contact with the fuel rod transfer region 132 on which the first eddy current sensor 131 is mounted.

Here, the cylinder 120 is driven in upward and downward directions in parallel to the outer fuel rods of the nuclear fuel assembly, and thus a state of the oxide layer of each outer fuel rod is continuously measured by the first eddy current sensor 131 mounted on the fuel rod transfer region 132 of the first probe 130.

The transfer roller 133 mounted above the fuel rod transfer region 132 in a lengthwise direction comes into contact with the fuel rod having an oxide layer to be tested, and the transfer support regions 134 located on the either sides of the fuel rod transfer region 132 come into contact with fuel rods located on left and right sides of the fuel rod having an oxide layer to be tested, respectively. Thus, the transfer roller 133 serves to guide the first probe 130 so that it does not deviate from its path while the first probe 130 connected to the cylinder 120 is driven in upward and downward directions to test the cladding of each outer fuel rod of the nuclear fuel assembly.

The measurement unit 100 is a portion where probes for testing the claddings of fuel rods of nuclear fuel assembly are mounted. The measurement unit 100 includes a frame 110 in which the cylinder 120, which can be driven in upward and downward directions as shown in detail in FIG. 3, is mounted, the first probe 130 connected to one side of the cylinder 120 via the first lower plate 136, a second probe 140 connected to another side of the cylinder 120 via a second lower plate 143, and a transfer table 150 supporting the frame 110.

Figure 4:
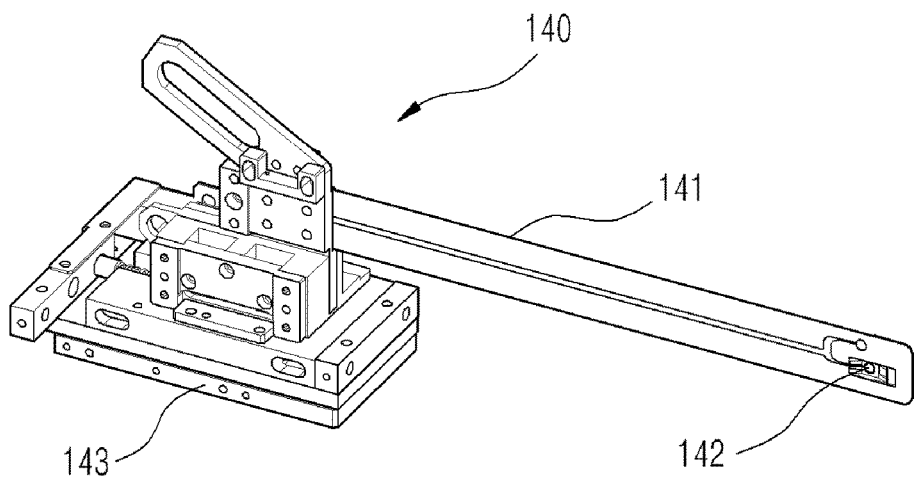
FIG. 4 is a perspective view showing a second probe used in the present invention.
Figure 5:
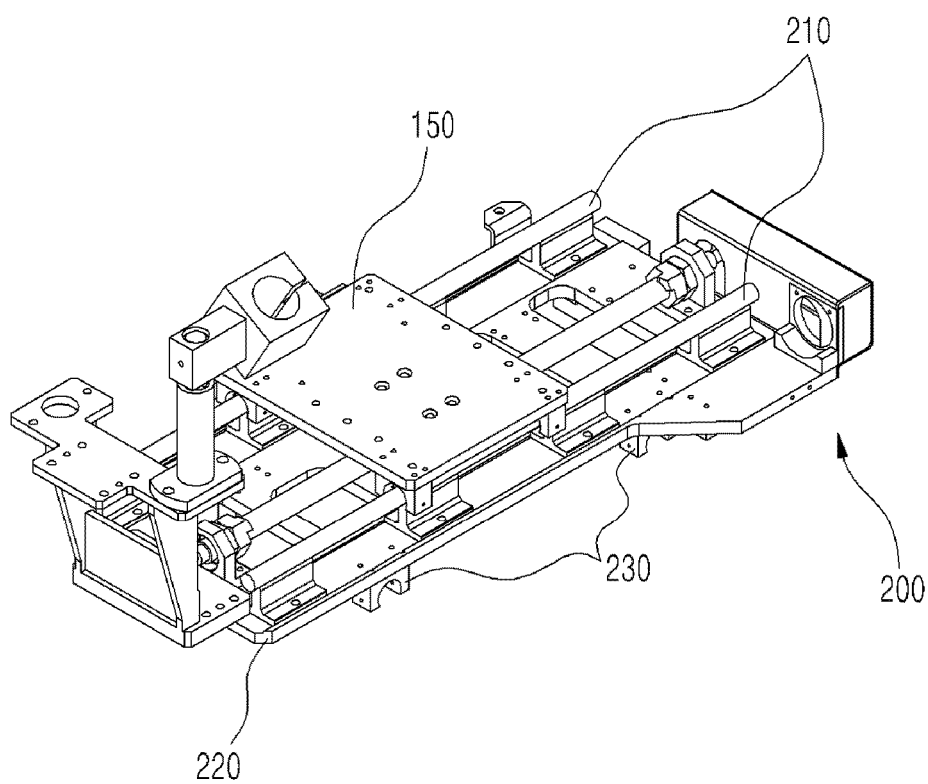
FIG. 5 is a perspective view showing a transverse transfer unit used in the present invention.
Figure 6:
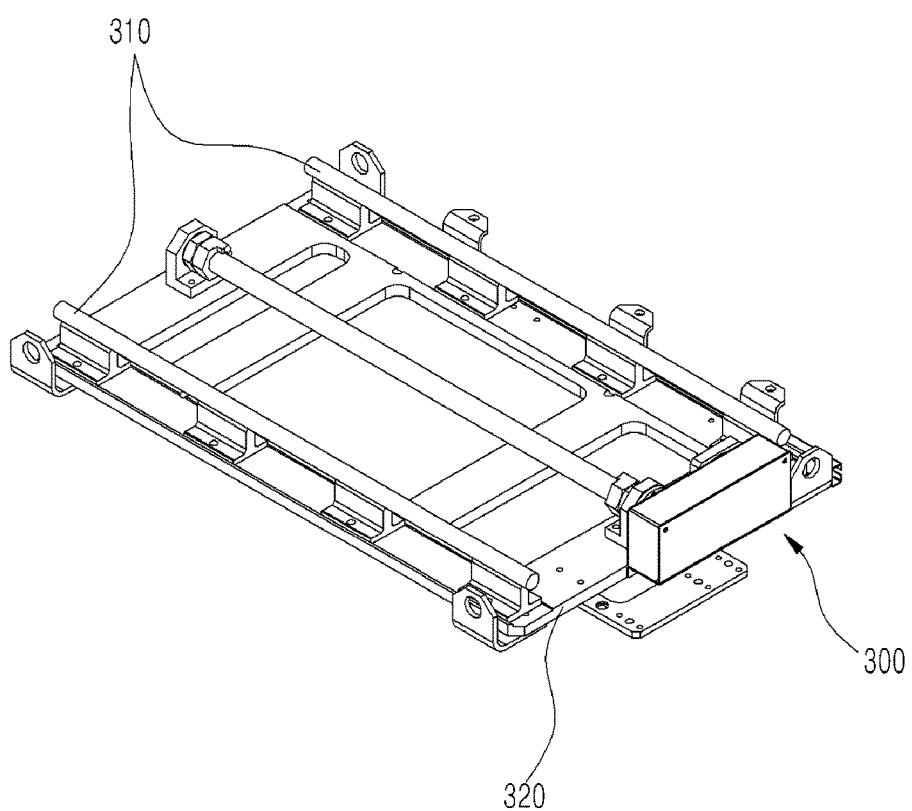
FIG. 6 is a perspective view showing a longitudinal transfer unit used in the present invention.

As shown in FIG. 4, the second probe 140 includes a strip 141, a second eddy current sensor 142 mounted on one end of the strip 141, and the second lower plate 143 supporting the strip 141.

In detail, the second lower plate 143 of the second probe 140 is connected to another side of the cylinder 120, as shown in FIG. 3. The measurement unit 100 is configured to be driven along first guide rails 210 of the transvers transfer unit 200 in leftward or rightward directions and along second guide rails 310 of the longitudinal transfer unit 300 in forward or backward directions.

The apparatus 1 for measuring the thickness of an oxide layer of a fuel rod is positioned adjacent to the nuclear fuel assembly, and the strip 141, on which the second eddy current sensor 142 of the second probe 140 is mounted, is inserted between the fuel rods by the longitudinal transfer unit 300.

At this time, the second eddy current sensor 142 detects an amount of eddy current induced on the fuel rod when coming into contact with the fuel rod, so that it can measure the state (e.g., thickness) of the oxide layer at a specific point of the fuel rod. In this embodiment, the second eddy current sensor is a contact type of sensor, but it can be a contactless sensor or a proximity sensor.

Further, the strip 141 has a predetermined length, for example, a length of a side of the nuclear fuel assembly, and is configured to be able to be displaced in forward and backward directions by the longitudinal transfer unit 300. As such, when the measurement unit 100 is displaced in the forward direction by the longitudinal transfer unit 300, the strip 141 on which the second eddy current sensor is mounted is inserted into the nuclear fuel assembly, so that it is possible to examine the state of the oxide layer of the inner fuel rod of the nuclear fuel assembly.

The transverse transfer unit 200 includes a first support bed 220 and the first guide rails 210 so that the measurement unit 100 including the first probe 130 and the second probe 140 can be driven in left and right directions. Sliding members 230 having a semicircular recess are mounted on a bottom surface of the first support bed 220, so that the transverse transfer unit 200 can be driven along the second guide rails 310 installed on the longitudinal transfer unit 300 in the forward and backward directions.

In detail, the apparatus 1 for measuring the thickness of an oxide layer of a fuel rod is positioned adjacent to the nuclear fuel assembly. When the oxide layer of each outer fuel rod is to be measured by the first probe 130, the measurement unit 100 is moved by the transverse transfer unit 200 so that the fuel rod to be tested and the neighboring fuel rods located on left and right sides of the fuel rod to be tested are positioned in parallel to the fuel rod transfer region 132 and the transfer support regions 134.

Further, when the oxide layer of each inner fuel rod is to be measured by the second probe 140, the second probe 140 is moved by the longitudinal transfer unit 300 so that the strip 141, on which the second eddy current sensor 142 is mounted, can be inserted between the fuel rods and contacted with an inner fuel rod to be measured.

Since the longitudinal transfer unit 300 includes a second support bed 320 and the two second guide rails 310, the sliding members 230, each of which has a semicircular recess and is mounted on the bottom surface of the first support bed 220 of the transverse transfer unit 200, are allowed to be driven along the second guide rails 310 of the longitudinal transfer unit 300 in the forward and backward directions.

In detail, when the inner fuel rods of the nuclear fuel assembly are tested by the second probe 140 mounted on the measurement unit 100, the strip 141 on which the second eddy current sensor 142 is mounted is positioned so as to be able to be inserted between the fuel rods by the transverse transfer unit 200, and then is inserted between the fuel rods by the longitudinal transfer unit 300. An amount of eddy current generated at the specific point where the inner fuel rod comes into contact with the second eddy current sensor 142 is detected so that the thickness of the oxide layer can be measured.

The principle of measuring the thickness of the oxide layer on the basis of the eddy current sensor is as follows. When an alternating current flows to the eddy current sensor, an electromagnetic field is formed around the eddy current sensor. The electromagnetic field induces an eddy current on a surface of the fuel rod. If any defect is present on the surface of the fuel rod, the eddy current is distorted. When an amount of the distorted eddy current is measured, the type and size of the defect on the surface of the fuel rod can be detected. When measuring the thickness of the oxide layer, if the oxide layer has no defect, no eddy current is induced on the surface of the fuel rod. However, because the oxide layer is a nonconductor, the thicker the oxide layer becomes, the smaller the eddy current is induced on the surface of the fuel rod. This is called "lift-off." The thickness of the oxide layer deposited on the cladding of the fuel rod can be measured by measuring this lift-off value.

Although the exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for simultaneously measuring two fuel rods assembled in a nuclear fuel assembly, the apparatus comprising:
   a frame installed in a vertical direction;
   a cylinder supported by the frame and configured to move vertically along the frame;
   a first probe disposed at a first side of the cylinder, the cylinder configured to move the first probe vertically, the first probe configured to measure a cladding of a first fuel rod that is at a periphery of the nuclear fuel assembly, the first probe including:
      a first lower plate mounted on the cylinder and configured to support the first probe,
      a fuel rod guide part disposed on the first lower plate and having a semi-circular channel shape formed in the vertical direction, the fuel rod guide part configured to move along the first fuel rod,
      a guide roller mounted above the fuel rod guide part disposed on the first lower plate and configured to guide the first probe along the first fuel rod,
      a first eddy current sensor mounted on the fuel rod guide part and configured to detect an amount of eddy current induced on the first fuel rod, and
      at least one supporting guide part disposed on the first lower plate side by side with the fuel rod guide part, the supporting guide part having a semi-circular channel shape and being configured to move along a neighboring fuel rod placed next to the first fuel rod; and
   a second probe disposed at a second side of the cylinder and configured to simultaneously measure a cladding of a second fuel rod that is disposed at an interior position of the nuclear fuel assembly not adjacent to the first fuel rod.

2. The apparatus as set forth in claim 1, wherein the first probe is configured to measure the cladding of the first fuel rod of the nuclear fuel assembly using the first eddy current sensor while the first eddy current sensor moves in the vertical direction along the first fuel rod.

3. The apparatus as set forth in claim 1, wherein the second probe includes: a second lower plate mounted on the cylinder and supporting the second probe, a strip disposed on the second lower plate, having a thin and long strip shape configured to be inserted between fuel rods in the nuclear fuel assembly; and a second eddy current sensor mounted on one end of the strip and configured to measure the cladding of the second fuel rod of the nuclear fuel assembly.

4. The apparatus as set forth in claim 1, further comprising: a transverse transfer unit configured to support the first and second probes and configured to move the first and second probes along a first horizontal direction; a longitudinal transfer unit configured to support the transverse transfer unit and configured to move the first and second probes along a second horizontal direction orthogonal to the first horizontal direction; and a support unit configured to support both the transverse transfer unit and the longitudinal transfer unit, wherein the second probe is configured to measure the cladding of the second fuel rod of the nuclear fuel assembly using the second eddy current sensor while the second eddy current sensor moves in the second horizontal direction.

5. An apparatus for simultaneously measuring two fuel rods assembled in a nuclear fuel assembly, the apparatus comprising:
 a support unit;
 a longitudinal transfer unit disposed on the support unit and including first guide rails mounted on the longitudinal transfer unit;
 a transverse transfer unit disposed on the longitudinal transfer unit and including second guide rails mounted on the transverse transfer unit and a transfer table moving along the second guide rails, the transverse transfer unit configured to move in a first horizontal direction on the longitudinal transfer unit along the first guide rails;
 a frame disposed on the transfer table of the transverse transfer unit and configured to move in a second horizontal direction that is orthogonal to the first horizontal direction along with the transfer table;
 a cylinder configured to move vertically along the frame;
 a first probe disposed at a first side of the cylinder, the cylinder configured to move the first probe vertically, the first probe configured to measure a cladding of a first fuel rod that is at a periphery of the nuclear fuel assembly, the first probe including:
  a first lower plate mounted on the cylinder and configured to support the first probe,
  a fuel rod guide part disposed on the first lower plate and having a semi-circular channel shape formed in the vertical direction, the fuel rod guide part configured to move along the first fuel rod,
  a guide roller mounted above the fuel rod guide part disposed on the first lower plate and configured to guide the first probe along the first fuel rod,
  a first eddy current sensor mounted on the fuel rod guide part and configured to detect an amount of eddy current induced on the first fuel rod, and
  at least one supporting guide part disposed on the first lower plate side by side with the fuel rod guide part, the supporting guide part having a semi-circular channel shape and being configured to move along a neighboring fuel rod placed next to the first fuel rod; and
 a second probe disposed at a second side of the cylinder and configured to simultaneously measure a cladding of a second fuel rod that is disposed at an interior position of the nuclear fuel assembly not adjacent to the first fuel rod and including:
  a second lower plate mounted on the cylinder and configured to support the second probe,
  a strip disposed on the second lower plate, having a thin and long strip shape configured to be inserted between fuel rods in the nuclear fuel assembly; and
  a second eddy current sensor mounted on one end of the strip and configured to measure the cladding of the second fuel rod of the nuclear fuel assembly
 wherein the first probe is configured to measure the cladding of the first fuel rod of the nuclear fuel assembly using the first eddy current sensor while the first eddy current sensor moves in the vertical direction along the first fuel rod, and
 wherein the second probe is configured to measure the cladding of the second fuel rod of the nuclear fuel assembly using the second eddy current sensor while the second eddy current sensor moves in the first horizontal direction.

* * * * *